July 31, 1945.    B. A. COUSINO    2,380,632
PROJECTION STAND
Filed March 27, 1944
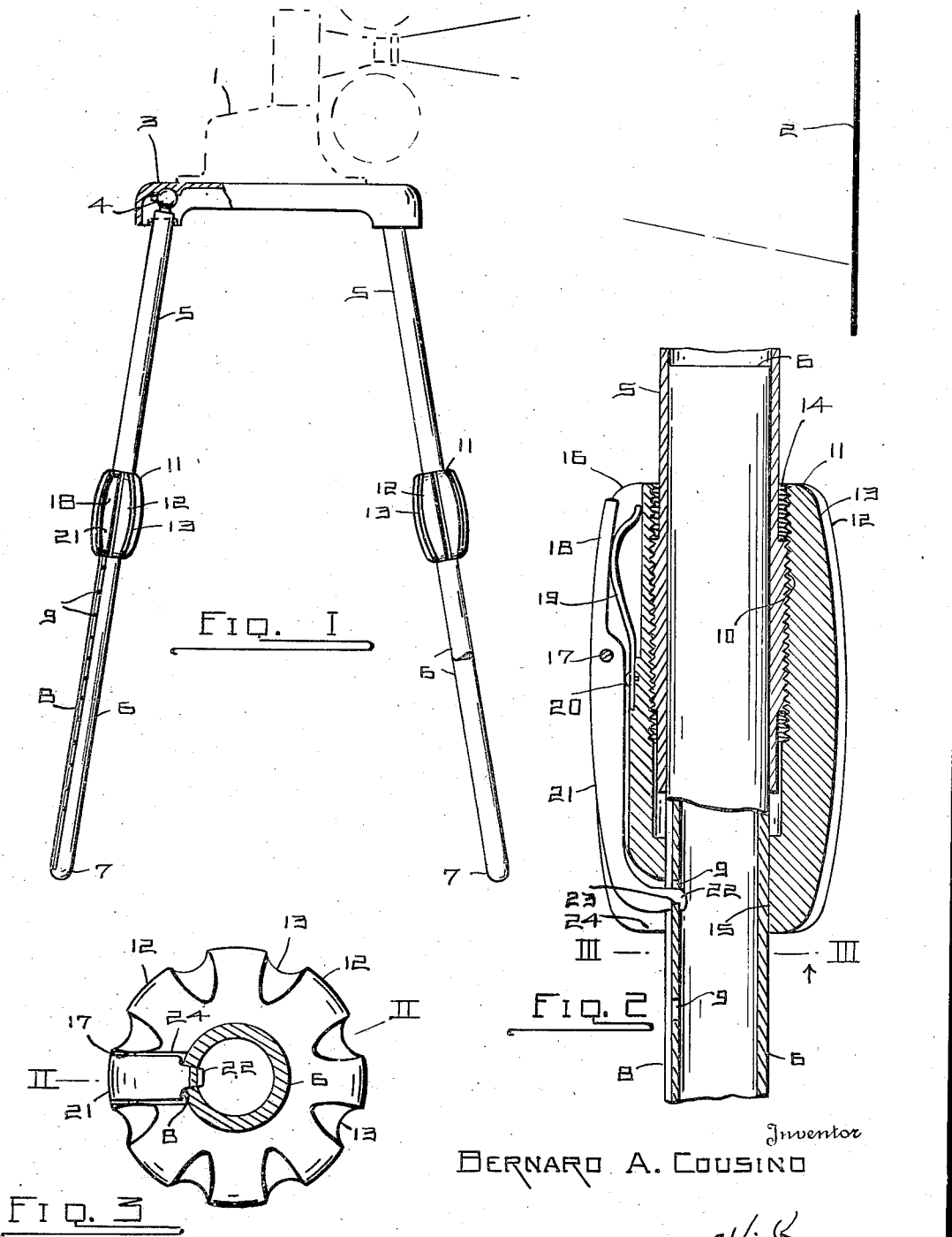
Inventor
BERNARD A. COUSINO Patented July 31, 1945

2,380,632

UNITED STATES PATENT OFFICE 2,380,632

PROJECTION STAND

Bernard A. Cousino, Toledo, Ohio

Application March 27, 1944, Serial No. 528,203

2 Claims. (Cl. 248—191)

This invention relates to features of coarse and fine adjustments in sequence, especially for spacing members or supports.

This invention has utility when incorporated in adjustable struts or legs for tables and stands, more particularly when for picture projection purposes.

Referring to the drawing:

Fig. 1 is a side elevation, with parts broken away, of an embodiment of the invention in a motion picture projection stand;

Fig. 2 is a fragmentary view on an enlarged scale of a leg of Fig. 1, at the adjustable joint or connection, the grip or nut being in section; from the line II—II, Fig. 3; and Fig. 3 is a section on the line III—III, Fig. 2, looking toward the grip or nut.

For locating a motion picture projection apparatus 1 to show pictures in proper location upon a remote screen 2, there is provided a stand or deck top 3, from which in this instance the supports or legs depend, three such legs being provided in the showing herewith.

At the under side of the stand or table top 3 knuckle or hinge joints 4 mount upper tubular leg sections 5 to be held against rotation on the axis of such tube as normally swingable on the joint 4, say for an outward stabilizing spread angle of 10°. In telescopic relation thereto is inner lower relatively rotatable leg section 6 having lower terminus or foot portion 7.

The leg sections 6 longitudinally thereof have a key portion, herein shown as a groove or spline way 8. Along the track of bottom of this way or spline 8 are seats or openings 9.

For a distance greater than the distance between an adjoining or adjacent pair of openings 9, the lower portion of the leg sections 6 have externally threaded regions 10. The lug on the ball at the joint 4 partially enters the depending flange of the socket to key or hold the section 6 against rotation during adjustment.

A sleeve 11 with longitudinally extending ribs 12 spaced by grooves 13 provides a grip having an internally threaded portion 14 adapted to coact with the external thread regions 10 of the leg sections 5. That portion of the grip or sleeve 11 downward or from thread region 14, has a guide portion 15 through which the lower leg section 6 may be thrust into telescopic assembly within the leg portion 5.

Between a pair of adjacent grooves 13, the sleeve 11 has a way 16 transversely of which extends pivot pin 17 rockably mounting a catch or pawl device having an actuating arm 18 normally thrust outward from the sleeve 11, by leaf spring 19 having an anchoring stud connection 20 in the way 16 near the pivot pin 17.

This catch device, oppositely from the arm 18, has an arm 21 terminating in an offset end or dog portion 22 adopted to be thrust thru an opening 9 in the spline 8, and as the load settles down thereupon, to have notch 23 thereby lock this catch of the sleeve 11 with the leg portion 6, against relative rotation therebetween. The way 16 has portion 24 as a slot or opening into the guide portion 15.

From the foregoing, it is to be noted that the lower sleeve section 6, in setting up the stand, may be thrust thru the guide 15 into a leg section 5 as swung downward. In this operation, the spring 19 holds the head or dog 22 to ride in the spline way 8. While the sleeve or grip 11 may be detached from the leg section 5, in usual practice it is left in threaded engagement therewith. Upon approximation of the desired total leg length, the catch end 22 is allowed to enter an opening 9 nearest to such length for the leg. One holding the grip 11, may depress the arm 18 sufficiently against the action of the spring 19, to prevent the end 22 engagement with an opening 9, while riding in the way 8, until the desired length location be determined. With this catch or latch then released, and the load to settle down axially of the leg, there is at once a locking of this dog or pawl at the notch 23.

There is thus quickly and positively achieved a primary or coarse adjustment for a sought region of leg length determination. The experience in motion picture projection, as in factories before employees, in homes, and places of business, especially in meeting occasion for temporary installation, involves questions of leveling as to the stand to place the projection equipment, but as to the remotely located screen, it is essential there be located the view region properly upon the screen. The great magnification of discrepancies at the screen from the stand top 3 confronts operators with a most serious problem to find and retain an acceptable relation for the screen, view thereon, and the projection apparatus at the stand top 3.

Hereunder, the operator having placed the legs to support the deck 3, may, as to any one of the legs positively and accurately effect a most minute upward or downward leg length variation. This is done by leaving the catch 22 engaged, and thru rotation of the grip 11 and the leg section 6 as locked therewith, clockwise as looking upward toward the top 3, for overall leg length shortening, while counterclockwise for lengthening. This rotation is with the internal thread 14 of the grip 11 coacting with the external thread 10 of the leg section 5. This turning action may be as little as a fraction of 1° or for many rotations complete. In such event as the manipulation runs toward the thread portion limits, then it is proper to reconnect the catch end 22 in the next opening 9 in the desired direction for length.

The practice hereunder means that very short time is taken in setting up equipment for acceptable projection purposes. There is available the quick approach in the sliding of the catch end 22 along the way 8 to lock at an opening 9. Then for refined nicety or minutiae of using, the grips as locked with the lower leg sections 6, are turned right or left, and the register as sought is self-locked due to the angle or friction action of the threads.

What is claimed and it is desired to secure by Letters Patent is:

1. A length adjustment structure comprising a first tubular section, a second aligned section adapted to telescope into the tubular section and extend therefrom and in such extent having a longitudinally extending way with a series of seats therealong, and an assembly sleeve spanning from the first to the second section and having thread connection with the first for length adjustment by relative rotation between the sleeve and the first section and having a dog slidable along the way to enter a seat and preclude relative rotation between the second section and the sleeve, whereby in operative assembly of the structure a relatively coarse and quick primary length adjustment is effected between the sleeve and second section by locating the dog in a seat from direct longitudinal shifting between the second section and the sleeve, and thereafter relatively fine and less rapid secondary length adjustment is effected between the sleeve and first section by rotating the sleeve relatively to the first section independently of disturbing the second section primary adjustment.

2. A leg joint rotatably and longitudinally responsive to length adjustment including a connecting sleeve and a pair of telescoping sections between which the sleeve overlaps, there being keyway and dog coaction between the sleeve and one section for direct longitudinal shifting for adjustment and interthreading coaction between the sleeve and the other section for direct rotatable shifting for final adjustment.

BERNARD A. COUSINO.